Nov. 7, 1950

W. F. BUTLER ET AL 2,528,737

BLOOD FILTER AND DRIP METER

Filed Feb. 14, 1947

INVENTORS
William F. Butler
BY Fred A Cutter

Mellin & Hanscom
ATTORNEYS

Patented Nov. 7, 1950

2,528,737

UNITED STATES PATENT OFFICE 2,528,737

BLOOD FILTER AND DRIP METER

William F. Butler and Fred A. Cutter, Oakland, Calif., assignors to Cutter Laboratories, Berkeley, Calif., a corporation of California Application February 14, 1947, Serial No. 728,680

7 Claims. (Cl. 128—214)

This invention relates to drip meters and blood filters for use in giving a blood transfusion to a patient.

Presently it is the practice to collect the blood of a donor in a flask containing a blood non-coagulant such as sodium citrate and then, when the occasion arises, to transfer this blood through a drip meter and filter to a patient. A filter is deemed to be a highly desirable expedient for, in spite of the sodium citrate, coagulation of the blood sometimes occurs and it is essential that no coagulated blood be delivered to the patient. A drip meter is inserted in the delivery tubing simply to give the physician or attendant an indication of the rate at which the blood is flowing through the equipment and the condition of the blood.

There are two objections to the equipment now in use. In the first place, blood is delivered to the filter and drip meter through a nipple of a diameter of necessity so small that it can be easily plugged by a small clot of blood. In the second place, the filter per se is designed as a permanent part of the equipment and therefore must be washed and sterilized after each use.

In general, the object of this invention is the provision of a disposable filter designed to be inserted into a flask through the elastomer stopper thereof and to filter the blood through an extended area prior to the passage of the blood through any restricted nipples or tubes.

More specifically, the object of this invention is the provision of a blood filter and drip meter including: a perforated tube removably secured to and extending into a transparent drip meter cylinder, and an expandable, form-sustaining filter stocking removably mounted over the free end of the tube and provided with a spear head for piercing the stopper of a transfusion flask and introducing the stocking into the flask.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Figure 1:
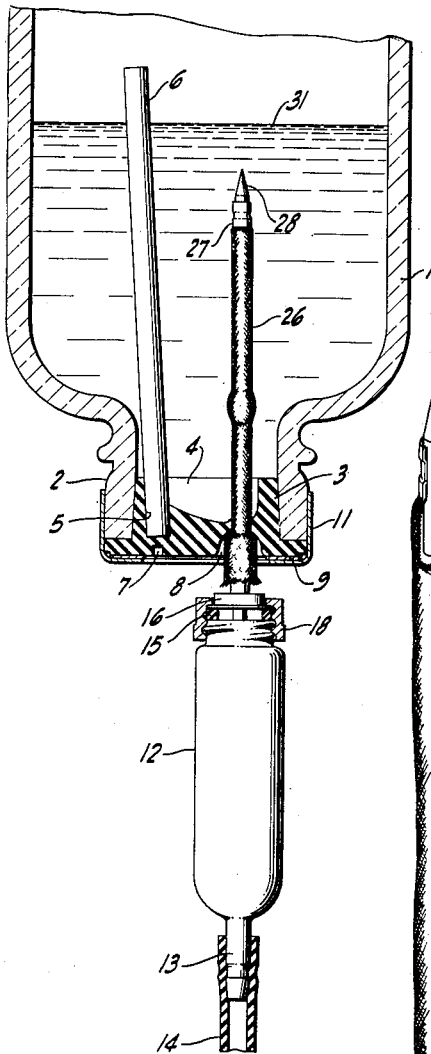
Fig. 1 is a vertical mid-section taken through a flask provided with a blood filter and drip meter embodying the objects of my invention and showing the filter stocking snugly contracted about the perforated tube on which it is mounted.
Figure 2:
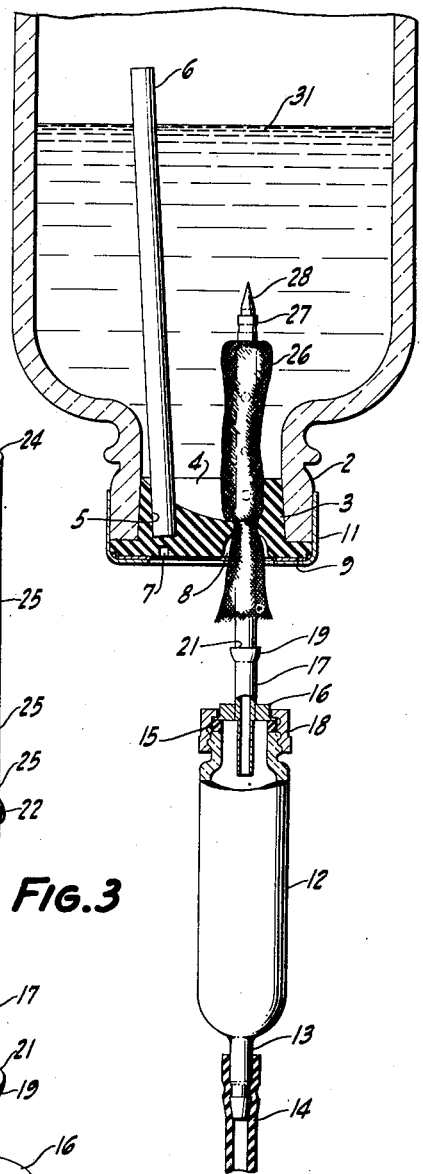
Fig. 2 is a vertical mid-section similar to that illustrated in Fig. 1 but showing the perforated tube and drip meter drawn downwardly to its operative position with the filter stocking expanded.
Figure 3:
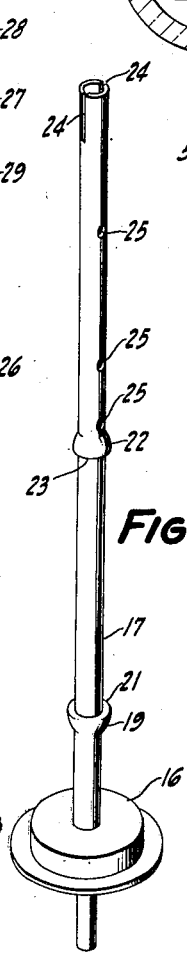
Fig. 3 is a perspective detail of the perforated filter stocking supporting tube.
Figure 4:
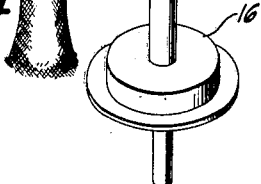
Fig. 4 is a perspective view of the disposable filter stocking with a portion of its closed end broken away to show the construction of the spear head associated therewith.

As shown in Figs. 1 and 2, our blood filter and drip meter is associated with a transfusion flask including a body 1 and a neck 2. Closing the neck of the flask is a flanged elastomer stopper 3 provided on its inner face with a blood clot sump 4 and a bore 5 for the reception of an air eduction tube 6. Provided on the outer face of the stopper 3 is a recess 7 in alignment with the eduction tube 6 and a recess 8 overlying the sump 4. Disposed over the outer end of the stopper 3 is a foil disc 9, and sealing this disc to the stopper and to the neck of the flask is a conventional two-piece cap 11, the central portion of which can be readily torn away when it is desired to gain access to the flask.

As shown in Figs. 1, 2, 3 and 4, our blood filter and drip meter includes a transparent drip meter cylinder 12 provided at its lower end with a nipple 13 arranged to receive a section of flexible tubing 14 through which the filtered and metered blood passes to the patient. Seated over the upper end of the flask 12 is a rubber washer 15 and seated on the washer 15 is a flanged disc 16 carried on the lower end of a metal tube 17. The washer 15 is sealed to the upper end of the cylinder 12 and to the disc 16 by a flanged collar 18 threaded to the upper end of the cylinder 12. Provided on the tube 17 is a downwardly converging projection 19 formed with a shoulder 21 and an upper upwardly converging projection 22 provided with a shoulder 23. The upper end of the tube 17 is split as at 24, and that portion of the tube lying between its upper end and the upper projection 22 is provided with a number of filtrate inlets 25.

Disposed over the tube 17 is a form-sustaining stocking 26 fabricated from glass filaments in a herringbone stitch. Secured to the upper end of the stocking 26 by a crimped sleeve 27 is a spear head 28 having a lower end 29 arranged to telescope into the upper split end of the tube 17 and to be removably secured thereto by frictional engagement therewith.

To use this combination blood filter and drip meter, the spear head 28 is pierced through the narrow portion of the stopper 3 as shown in Fig. 1, and the tube 17 and its associated stocking 26 forced through the resulting incision until the lower shoulder 21 engages the outer face of the stopper. During this movement of the tube 17 the stocking 26 is in snugly contracted engagement with the tube. The tube 17 is then pulled downwardly until the upper shoulder 23 comes into engagement with the inner wall of the stopper. During this downward movement of the tube 17 the lower portion of the stocking 26 is held against movement due to its frictional engagement with the stopper which is greater than the frictional force between the inner surface of the stocking and the tube 17. The upper end of the stocking 26, however, travels downwardly with the upper end of the tube 17, thereby serving to expand that portion of the stocking lying between the stopper and the sleeve 27 to force it radially away from the tube 17, as shown in Fig. 2. Here it should be noted that the frictional engagement between the lower end 29 of the spear head 28 and split upper end of the tube 17 is sufficient to hold these two members in engagement with each other against the slight upward force exerted by the stocking which in this position is under compression and form-sustaining. In this position of the device all of the blood 31 contained within the flask of necessity passes through the filter stocking 26 before it passes through the filtrate inlets 25 of the tube 17. If, therefore, any clots have formed in the blood, they are retained on the outer surface of the stocking and prevented from clogging the inlet openings 25. Consequently the flow of blood through the device is sustained regardless of the formation of blood clots.

The blood passing into the tube 17 is discharged in the form of drops from the lower end of the tube within the transparent cylinder 12, thereby giving to the physician or attendant an indication as to the rate at which the transfusion is proceeding and the condition of the blood.

After the transfusion has been completed, the tube 17 and its associated filter stocking are removed from the stopper, and the filter stocking 26 thrown away.

It will therefore be seen that by this expedient we have provided a disposable filter element and means whereby blood may be filtered within the transfusion flask prior to its passage through any restricted openings and which at the same time serves as a drip meter for indicating the condition of the blood and the rate at which the transfusion is proceeding.

We claim:

1. An assembly comprising: a spear head; a filter stocking supported by and depending from said spear head, the upper end of said stocking being closed and its lower end being open; and a rigid perforated tube mounted on and depending from said spear head, said spear head, stocking and tube being adapted to be forced through the stopper of a flask with a portion of said stocking sealed between said tube and said stopper.

2. An assembly comprising: a tube provided at one end with a spear head and formed with a filtrate inlet intermediate its ends; and a filter stocking surrounding said tube and secured to said spear head, said spear head, tube and stocking being adapted to be forced into a container through a piercible stopper with a portion of said stocking sealed between said stopper and said tube.

3. An assembly comprising: a tube formed intermediate its ends with a filtrate inlet; a spear head frictionally secured to one end of said tube; and a filter stocking disposed over said tube and secured at one end to said spear head, said spear head, tube and stocking being adapted to be forced into a container through a piercible resilient stopper with a portion of said stocking resiliently sealed between said stopper and said tube.

4. An assembly comprising: a tube provided intermediate its ends with a filtrate inlet; a spear head mounted on one end of said tube and a form-sustaining filter stocking disposed over said tube and secured at one end to said spear head, said spear head, tube and stocking being adapted to be forced into a container through a resilient piercible stopper with a portion of said stocking resiliently sealed between said tube and said stopper.

5. An assembly comprising: a tube provided intermediate its ends with a filtrate inlet, said tube being split at one end; a spear head frictionally engaged in the split end of said tube; a form-sustaining filter stocking surrounding said tube and secured at one end to said spear head, said spear head, tube and stocking being adapted to be forced into a container through a resilient piercible stopper with a portion of said stocking resiliently sealed between said tube and said stopper.

6. Transfusion equipment comprising: a flask closed by an elastomer stopper; a tube extending through said stopper into said flask, said tube being provided with a filtrate inlet within said flask; a filter stocking surrounding said tube and extending through said stopper, the internal end of said stocking being secured to the internal end of said tube and an intermediate portion of said stocking being sealed between said stopper and said tube.

7. An assembly comprising: a rigid rod; a filter stocking mounted on the upper end of said rod, the upper end of said stocking being closed and its lower end being open; said rod and stocking being adapted to be forced through the stopper of a transfusion flask.

WILLIAM F. BUTLER.
FRED A. CUTTER.

REFERENCES CITED

The following references are of record in the file of this patent:

UNITED STATES PATENTS

| Number | Name | Date |
| --- | --- | --- |
| 144,468 | Miller | Nov. 11, 1873 |
| 170,124 | Spicer | Nov. 16, 1875 |
| 563,712 | Evans | July 7, 1896 |
| 796,910 | Hernan | Aug. 8, 1905 |
| 1,704,634 | Snider | Mar. 5, 1929 |
| 2,212,318 | Gee | Aug. 20, 1940 |
| 2,231,418 | Trotter | Feb. 11, 1941 |
| 2,309,302 | Butler et al. | Jan. 26, 1943 |
| 2,435,820 | Diggs | Feb. 10, 1948 |

FOREIGN PATENTS

| Number | Country | Date |
| --- | --- | --- |
| 229,160 | Germany | Dec. 3, 1910 |